United States Patent
Kim et al.

(10) Patent No.: US 8,379,606 B2
(45) Date of Patent: Feb. 19, 2013

(54) ACCESS PROBE RANDOMIZATION FOR WIRELESS COMMUNICATION SYSTEM

(75) Inventors: Sang G Kim, San Diego, CA (US); Shu Wang, San Diego, CA (US); Young C Yoon, San Diego, CA (US); Suk Woo Lee, San Diego, CA (US); Li-Hsiang Sun, San Diego, CA (US); Hobin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 1400 days.

(21) Appl. No.: 11/534,520

(22) Filed: Sep. 22, 2006

(65) Prior Publication Data

US 2007/0076682 A1    Apr. 5, 2007

Related U.S. Application Data

(60) Provisional application No. 60/720,227, filed on Sep. 22, 2005.

(51) Int. Cl.
*H04J 3/00*    (2006.01)
*H04L 12/413*    (2006.01)
(52) U.S. Cl. ......... 370/337; 370/445; 370/447; 370/448
(58) Field of Classification Search ............ 370/337
See application file for complete search history.

(56) References Cited

U.S. PATENT DOCUMENTS

| 6,535,736 | B1 | 3/2003 | Balogh et al. |
|---|---|---|---|
| 2003/0199252 | A1* | 10/2003 | Tiedemann et al. ........... 455/69 |
| 2004/0032877 | A1* | 2/2004 | Chuah et al. ................. 370/444 |
| 2005/0026621 | A1 | 2/2005 | Febvre et al. |

FOREIGN PATENT DOCUMENTS

| EP | 0994604 B1 * | 5/1999 |
|---|---|---|
| EP | 0994604 | 4/2000 |
| JP | 2000-209661 | 7/2000 |
| JP | 2000-358274 | 12/2000 |
| JP | 2004-201340 | 7/2004 |
| JP | 2004-302340 | 10/2004 |
| WO | WO 93/18601 * | 9/1993 |

OTHER PUBLICATIONS

Attar, R et al.: "PN Randomization for DO Revision B", 3GPP2 TSG-C, C30-20050920-011, Sep. 20, 2005.

* cited by examiner

*Primary Examiner* — Huy C Ho
(74) *Attorney, Agent, or Firm* — Lee, Hong, Degerman, Kang & Waimey

(57) ABSTRACT

A method and apparatus for randomizing access probes from co-located mobile terminals in order to reduce collisions is provided. By each mobile terminal or group of mobile terminals computing a random delay between a minimum delay value and a maximum delay value and using the random delay to delay the starting time of access probes, collisions between access probes from different mobile terminals may be reduced.

28 Claims, 16 Drawing Sheets

ACCESS PORBE SEQUENCES

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

CDMA 2000 SYSTEM ACCESS STATE

CDMA2000 ACCESS ATTEMPT

CDMA ACCESS SUB-ATTEMPT $N = MAX\_RSP\_SEQ_S$ for Response messages, or
$MAX\_RSP\_SEQ_S$ for Request messages PD=0 for Response messages

CDMA SYSTEM ACCESS STATE USING SLOT OFFSET

COMPARISON OF CDMA2000 FOR 1x AND 1xEV-DO

IS-95 Forward Link Struction

1xEV-DO Forward Link Structure

1xEV-DO NETWORK ARCHITECTURE

1xEV-DO DEFAULT PROTOCOL

1xEV-DO NON-DEFAULT PROTOCOL

1xEV-DO SESSION ESTABLISHMENT

1xEV-DO CONNECTION LAYER PROTOCOLS

ACCESS PORBE SEQUENCES

ACCESS PROBE STRUCTURE

MOBILE STATION/ACCESS TERMINAL

ACCESS PROBE RANDOMIZATION FOR WIRELESS COMMUNICATION SYSTEM

CROSS-REFERENCE TO RELATED APPLICATIONS

Pursuant to 35 U.S.C. §119(e), this application claims the benefit of U.S. Provisional Application Ser. No. 60/720,227 filed on Sep. 22, 2005, the contents of which is hereby incorporated by reference herein in its entirety.

FIELD OF THE INVENTION

This invention is related to the randomization of access probes from co-located mobile terminals in order to reduce collisions.

DESCRIPTION OF THE RELATED ART

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

Referring to FIG. 1, a wireless communication network architectures is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves. The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are COMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

FIG. 3 illustrates a data link protocol architecture layer 20 for a cdma2000 wireless network. The data link protocol architecture layer 20 includes an Upper Layer 60, a Link Layer 30 and a Physical Layer 21.

The Upper layer 60 includes three sublayers; a Data Services sublayer 61; a Voice Services sublayer 62 and a Signaling Services sublayer 63. Data Services 61 are services that deliver any form of data on behalf of a mobile end user and include packet data applications such as IP service, circuit data applications such as asynchronous fax and B-ISDN emulation services, and SMS. Voice Services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

In the MS 2, the Signaling Services sublayer 63 is also responsible for maintaining call process states, specifically a MS 2 Initialization State, MS 2 Idle State, System Access State and MS 2 Control on Traffic Channel State.

The Link Layer 30 is subdivided into the Link Access Control (LAC) sublayer 32 and the Medium Access Control (MAC) sublayer 31. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 21.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The LAC sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a besteffort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 21 is responsible for coding and modulation of data transmitted over the air, The Physical Layer 20 conditions digital data from the higher layers so that the data may be transmitted over a mobile radio channel reliably.

The Physical Layer 21 maps user data and signaling, which the MAC sublayer 31 delivers over multiple transport channels, into a physical channels and transmits the information over the radio interface. In the transmit direction, the functions performed by the Physical Layer 21 include channel coding, interleaving, scrambling, spreading and modulation. In the receive direction, the functions are reversed in order to recover the transmitted data at the receiver.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

FIG. 5 illustrates the Initialization State of a MS 2. The Initialization State includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System Determination. A service provider using a redirection process may also control System Determination. After the MS 2 selects a system, it must determine on which channel within that system to search for service. Generally the MS 2 uses a prioritized channel list to select the channel.

Pilot Channel Acquisition is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the general page message or the universal page message may be used to page the mobile on F-CCCH. A quick paging channel that allows the MS 2 to power up for a shorter period of time than is possible using only slotted paging on F-PCH or F-CCCH is also supported.

FIG. 6 illustrates the System Access State. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an origination message. A response is a message sent in response to a message received from the BS 6. For example, a page response message is a response to a general page message or a universal message.

An access attempt, which refers to the entire process of sending one Layer 2 encapsulated PDU and receiving an acknowledgment for the PDU, consists of one or more access sub-attempts, as illustrated in FIG. 7. An access sub-attempt includes of a collection of access probe sequences, as illustrated in FIG. 8. Sequences within an access sub-attempt are separated by a random backoff interval (RS) and a persistence delay (PD). PD only applies to access channel request, not response.

FIG. 9 illustrates a System Access state in which collisions are avoided by using a slot offset of 0-511 slots.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for data only or Data Optimized ("DO"). Furthermore, there is a peak data rate of 4.9152 Mbps on the forward Link and 1.8432 Mbps on the reverse Link. Moreover, a 1xEV-DO system provides separated frequency bands and internetworking with a 1x System. FIG. 10 illustrates a comparison of cdma2000 for a 1x system and a 1xEV-DO system, In a cdma2000 system, there are concurrent services, whereby voice and data are transmitted together at a maximum data rate of 614.4 kbps and 307.2 kbps in practice. An MS 2 communicates with the MSC 5 for voice calls and with the PDSN 12 for data calls. A cdma2000 system is characterized by a fixed rate with variable power with a Walsh-code separated forward traffic channel.

In a 1xEV-DO system, the maximum data rate is 2.4 Mbps or 3,072 Mbps and there is no communication with the circuit-switched core network 7. A 1xEV-DO system is characterized by fixed power and a variable rate with a single forward channel that is time division multiplexed.

FIG. 11 illustrates a 1xEV-DO system architecture. In a 1xEV-DO system, a frame consists of 16 slots, with 600 slots/sec, and has a duration of 26.67 ms, or 32,768 chips. A single slot is 1.6667 ms long and has 2048 chips. A control/traffic channel has 1600 chips in a slot, a pilot channel has 192 chips in a slot and a MAC channel has 256 chips in a slot. A 1xEV-DO system facilitates simpler and faster channel estimation and time synchronization, FIG. 12 illustrates a 1xEV-DO system default protocol architecture. FIG. 13 illustrates a 1xEV-DO system non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The Stream Layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

FIG. 14 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange keys refers a Key Exchange protocol in the Security Layer setting up keys for authentication.

A "session" refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications. Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

FIG. 15 illustrates Connection Layer Protocols. As illustrated in FIG. 15, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the Connected State, an open connection is initiated and the Connected State Protocol is activated.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet demultiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a user data message and a signaling message. Two protocols are used to process the two types of messages, specifically a forward traffic channel MAC Protocol for the user data message and a control channel MAC Protocol, for the signaling message.

The Physical Layer 21 is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 4.9152 Mbps. Physical Layer packets can be transmitted in 1 to 16 slots and the transmit slots use 4-slot interlacing when more than one slot is allocated. If ACK is received. on the reverse Link ACK channel before all of the allocated slots have been transmitted, the remaining slots shall not be transmitted.

The control channel is similar to the sync channel and paging channel in cdma2000. The control channel is characterized by a period of 256 slots or 426.67 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

One reason for the potential of collision is the inefficiency of the current persistence test in conventional methods. Because an AT 2 may require a short connection setup time, a paged AT may transmit access probes at the same time as another paged AT when a persistence test is utilized.

Conventional methods that use a persistence test are not sufficient since each AT 2 that requires a short connection setup times and/or is part of a group call may have the same persistence value, typically set to 0. If AT's 2 are co-located, such as In a group call, the Access Probes arrive at the An 6 at the same time, thereby resulting in access collisions and increased connection setup time.

Therefore, there is a need for a more efficient approach for access probe transmission from co-located mobile terminals requiring short connection times. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide an apparatus and method for reducing collisions of access probes from co-located mobile terminals. By randomizing the time at which access probes are sent, collisions may be avoided.

In one aspect of the present invention, a method of providing a connection to a mobile terminal in a mobile communication system is provided. The method includes transmitting one or more access probes, each of the access probes requesting a connection to the network and the access probes transmitted until a network connection is acknowledged, wherein each of the access probes is transmitted according to a random delay, the random delay calculated prior to the transmission of each access probe as a value between a predetermined minimum value and a predetermined maximum value.

It is contemplated that the method includes transmitting each of the access probes according to the random delay and a mobile terminal time reference. It is further contemplated that the predetermined minimum and maximum values are set according to a quality of service (QoS) requirement of the mobile terminal, a location of the mobile terminal, a relationship between the mobile terminal and other mobile terminals and/or a service grade of the mobile terminal.

It is contemplated that the predetermined minimum and maximum values are the same as a predetermined minimum and maximum value for at least one other mobile terminal, the at least one other mobile terminal either having the same QoS as the mobile terminal or being co-located with the mobile terminal. It is further contemplated that the random delay includes a number of chips.

It is contemplated that a random delay range between the predetermined minimum value and predetermined maximum value is the same as a random delay range for at least one other mobile terminal and the random delay range does not overlap a random delay range for at least one other mobile terminal. It is further contemplated that either the predetermined minimum value or the predetermined maximum value is the same as a corresponding one of the predetermined minimum value and the predetermined maximum value of at least one other mobile terminal.

It is contemplated that the method includes receiving a unilaterally predetermined minimum value and maximum value from the network. It is further contemplated that the method includes negotiating the predetermined minimum value and maximum value with the network.

It is contemplated that the method includes updating the predetermined minimum value and maximum value when a quality of service (QoS) requirement of the mobile terminal changes, a location of the mobile terminal changes, a relationship between the mobile terminal and other mobile terminals changes and/or a service grade of the mobile terminal changes. It is further contemplated that the method includes transmitting each of the access probes according to a delay including the random delay and an access offset, the access offset fixed until a network connection is acknowledged.

It is contemplated that the method includes randomly selecting one of a plurality of access offsets assigned to the mobile terminal. It is further contemplated that each of the access probes is assigned an access probe number and the method further includes calculating the random delay according a user ID and/or the access probe number.

It is contemplated that the method includes calculating the random delay using a hash function. It is further contemplated that the method includes utilizing a normal timeline for traffic channels after the connection is provided. Preferably, the method includes not transmitting a first of the access probes according to the random delay.

It is contemplated that the method further comprises receiving a paging message from a network. It is further contemplated that the service grade is a Platinum class, a Gold class or a Silver class.

In another aspect of the present invention, a method of providing a connection to a mobile terminal in a mobile communication system is provided. The method includes receiving a paging message from a network, transmitting a first sequence including a predetermined number of access probes, each of the access probes requesting a connection to the network and sequentially transmitted until either a network connection is acknowledged or all of the access probes of the first sequence have been transmitted, wherein each of the access probes of the first sequence is transmitted according to a random delay, the random delay calculated prior to the transmission of each access probe as a value between a predetermined minimum value and a predetermined maximum value and transmitting at least a second sequence including the predetermined number of access probes if a network connection is not acknowledged after transmitting the first sequence, wherein each of the access probes of the at least second sequence is transmitted according to a random delay, the random delay a value between the predetermined minimum value and a predetermined maximum value.

It is contemplated that the method includes transmitting each of the access probes of the at least second sequence according to a random delay calculated prior to the transmission of each access probe. It is further contemplated that the method includes transmitting each of the access probes of the at least second sequence according to the same random delay previously calculated for the corresponding access probe in the first sequence.

It is contemplated that each of the access probes of the first sequence and each of the access probes of the at least second sequence is assigned an access probe number, the first sequence and the at least second sequence are each assigned an access probe sequence number and the method further includes calculating the random delay according to a user ID, the access probe number and/or the access probe sequence number. It is further contemplated that the method includes calculating the random delay using a hash function.

It is contemplated that the method includes utilizing a normal timeline for traffic channels after the connection is provided. It is further contemplated that the method includes not transmitting a first of the access probes of the first and second sequence according to the random delay.

In another aspect of the present invention, a mobile terminal is provided. The mobile terminal includes a transmitting/receiving unit adapted to transmit one or more access probes to the network, a display unit adapted to display user interface information, an input unit adapted to input user data and a processing unit adapted to process the paging message, generate the access probes and control the transmitting/receiving unit to transmit the access probes until a network connection is acknowledged, each of the access probes requesting a connection to the network and transmitted according to a random delay, the random delay calculated prior to the transmission of each access probe as a value between a predetermined minimum value and a predetermined maximum value.

It is contemplated that the processing unit is further adapted to transmit each of the access probes according to the random delay and a mobile terminal time reference. It is further contemplated that the predetermined minimum and maximum values are set according to a quality of service (QoS) requirement of the mobile terminal, a location of the mobile terminal, a relationship between the mobile terminal and other mobile terminals and/or a service grade of the mobile terminal.

It is contemplated that the predetermined minimum and maximum values are the same as a predetermined minimum and maximum value for at least one other mobile terminal, the at least one other mobile terminal either having the same QoS as the mobile terminal or being co-located with the mobile terminal. It is further contemplated that the random delay is a number of chips.

It is contemplated that the random delay range between the predetermined minimum value and predetermined maximum value is the same as a random delay range for at least one other mobile terminal and the random delay range does not overlap a random delay range for at least one other mobile terminal. It is further contemplated that either the predetermined minimum value or the predetermined maximum value is the same as a corresponding one of the predetermined minimum value and the predetermined maximum value of at least one other mobile terminal.

It is contemplated that the processing unit is further adapted to receive a unilaterally predetermined minimum value and maximum value from the network. It is further contemplated that the processing unit is further adapted to negotiate the predetermined minimum value and maximum value with the network.

It is contemplated that the processing unit is further adapted to update the predetermined minimum value and maximum value when a quality of service (QoS) requirement of the mobile terminal changes, a location of the mobile terminal changes, a relationship between the mobile terminal and other mobile terminals changes and/or a service grade of the mobile terminal changes. It is further contemplated that the processing unit is further adapted to transmit each of the access probes according to a delay including the random delay and an access offset, the access offset fixed until a network connection is acknowledged.

It is contemplated that the processing unit is further adapted to randomly select one of a plurality of access offsets assigned to the mobile terminal. It is further contemplated that each of the access probes is assigned an access probe number and the processing unit is further adapted to calculate the random delay according to a user ID and/or the access probe number.

It is contemplated that the processing unit is further adapted to calculate the random delay using a hash function. It is further contemplated that the processing unit is further adapted to utilize a normal timeline for traffic channels after a connection to the network is provided.

It is contemplated that the processing unit is further adapted to not transmit a first of the access probes according to the random delay. It is further contemplated that the processing unit is further adapted to generate a first sequence including a predetermined number of access probes and control the transmitting/receiving unit to sequentially transmit the first sequence until either a network connection is acknowledged or all of the access probes of the first sequence have been transmitted, each of the access probes requesting a connection to the network and transmitted according to a random delay, the random delay calculated prior to the transmission of each access probe as a value between a predetermined minimum value and a predetermined maximum value and generate at least a second sequence including the predetermined number of access probes and control the transmitting/receiving unit to transmit the second sequence if a network connection is not acknowledged after transmitting the first sequence, each of the access probes of the at least second sequence transmitted according to a random delay, the random delay a value between the predetermined minimum value and a predetermined maximum value.

It is contemplated that the processing unit is further adapted to transmit the access probes of the at least second sequence according to a random delay calculated prior to the transmission of each access probe. It is further contemplated that the processing unit is further adapted to transmit each of the access probes of the at least second sequence according to the same random delay previously calculated for the corresponding access probe in the first sequence.

It is contemplated that each of the access probes of the first sequence and each of the access probes of the at least second sequence is assigned an access probe number, the first sequence and the at least second sequence are each assigned an access probe sequence number and the processing unit is further adapted to calculate the random delay according to a user ID, the access probe number and/or the access probe sequence number. It is further contemplated that the processing unit is further adapted to calculate the random delay using a hash function.

It is contemplated that the processing unit is further adapted to utilize a normal timeline for traffic channels after the connection is provided. It is further contemplated that the processing unit is further adapted to not transmit a first of the access probes of the first and second sequence according to the random delay.

It is contemplated that the transmitting/receiving unit is further adapted to receive a paging message from a network. It is further contemplated that the service grade is a Platinum class, a Gold class or a Silver class.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with. the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
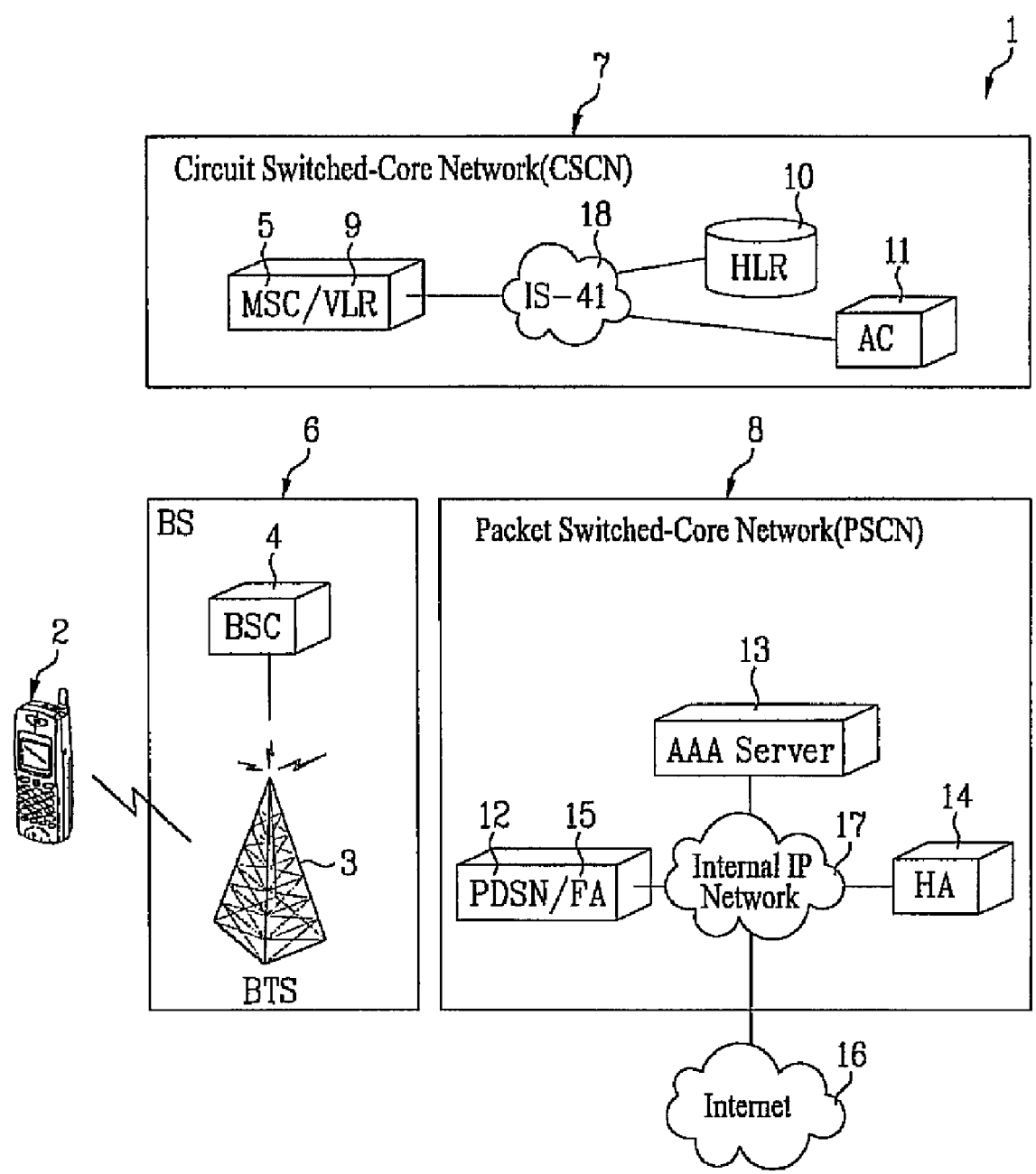
FIG. 1 illustrates wireless communication network architecture.
Figure 2A:
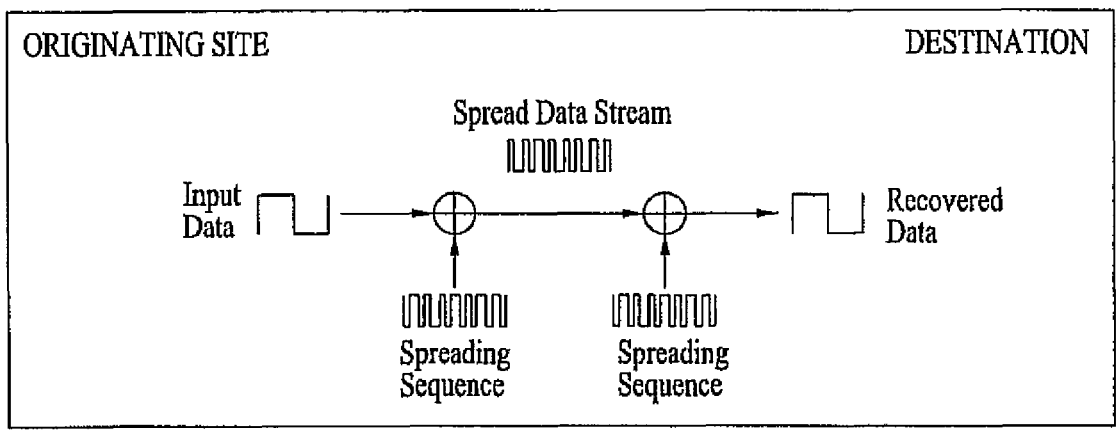
FIG. 2A illustrates a CDMA spreading and de-spreading process.
Figure 2B:
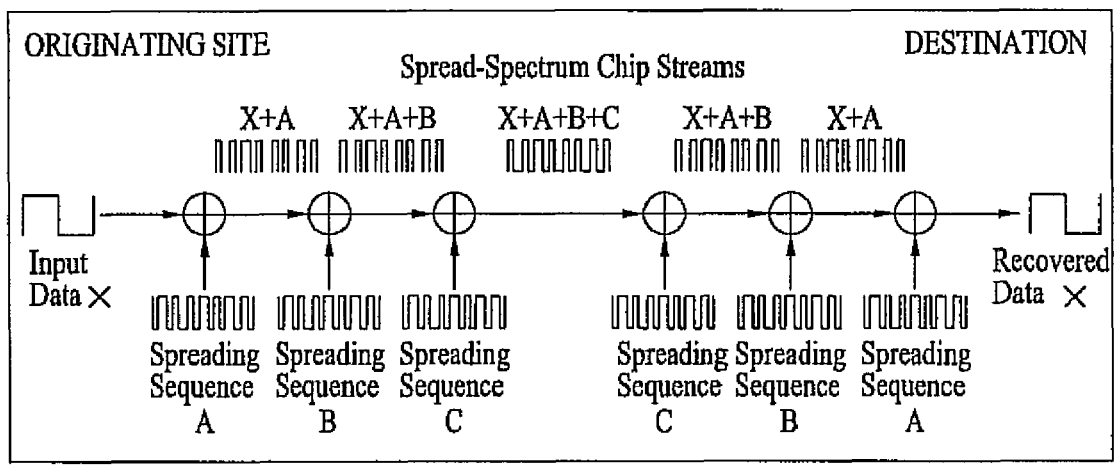
FIG. 2B illustrates a CDMA spreading and de-spreading process using multiple spreading sequences.
Figure 3:
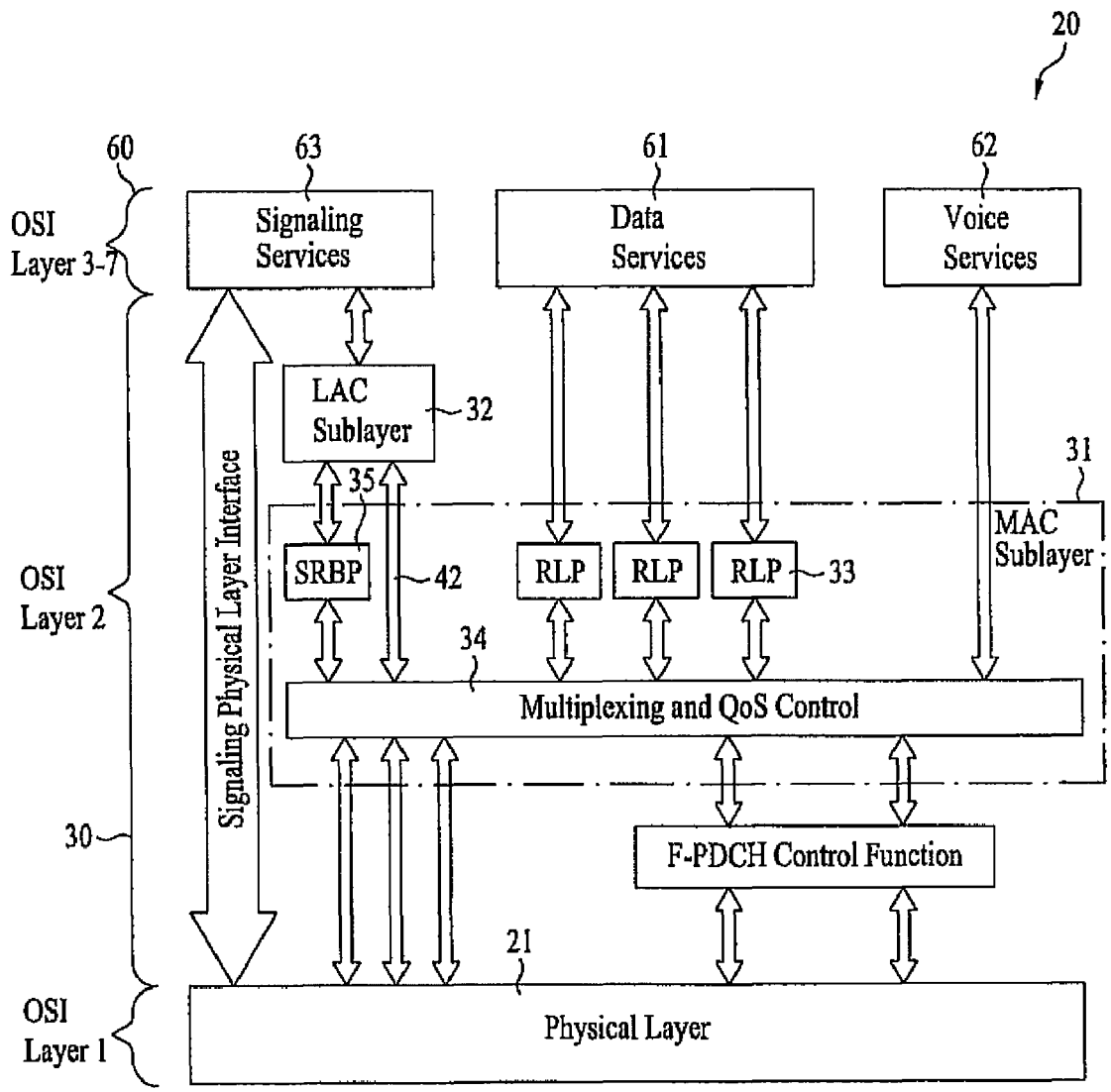
FIG. 3 illustrates a data link protocol architecture layer for a cdma2000 wireless network.
Figure 4:
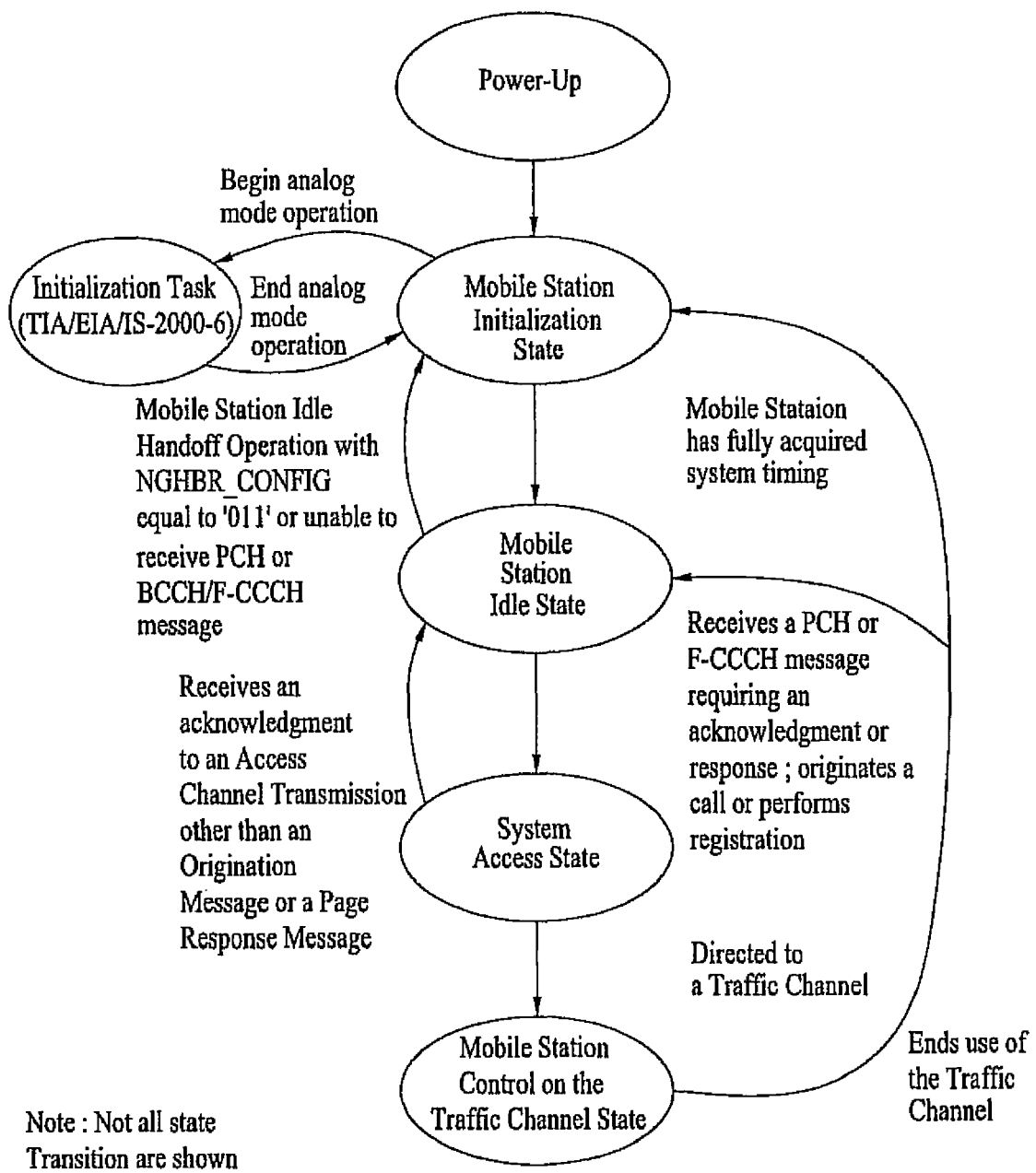
FIG. 4 illustrates cdma2000 call processing.
Figure 5:
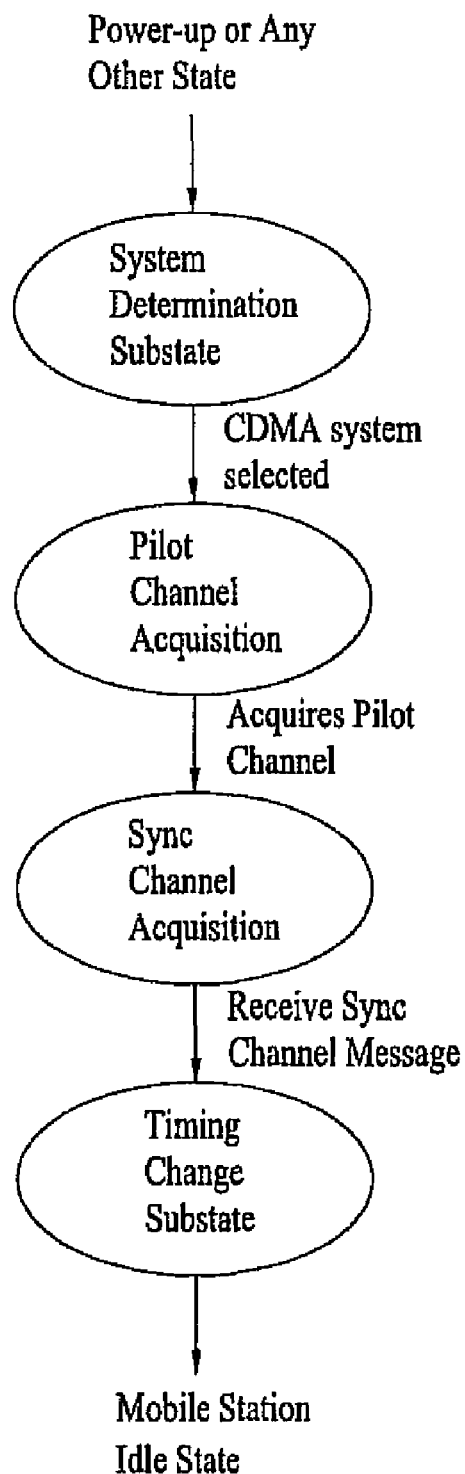
FIG. 5 illustrates the cdma2000 initialization state.
Figure 6:
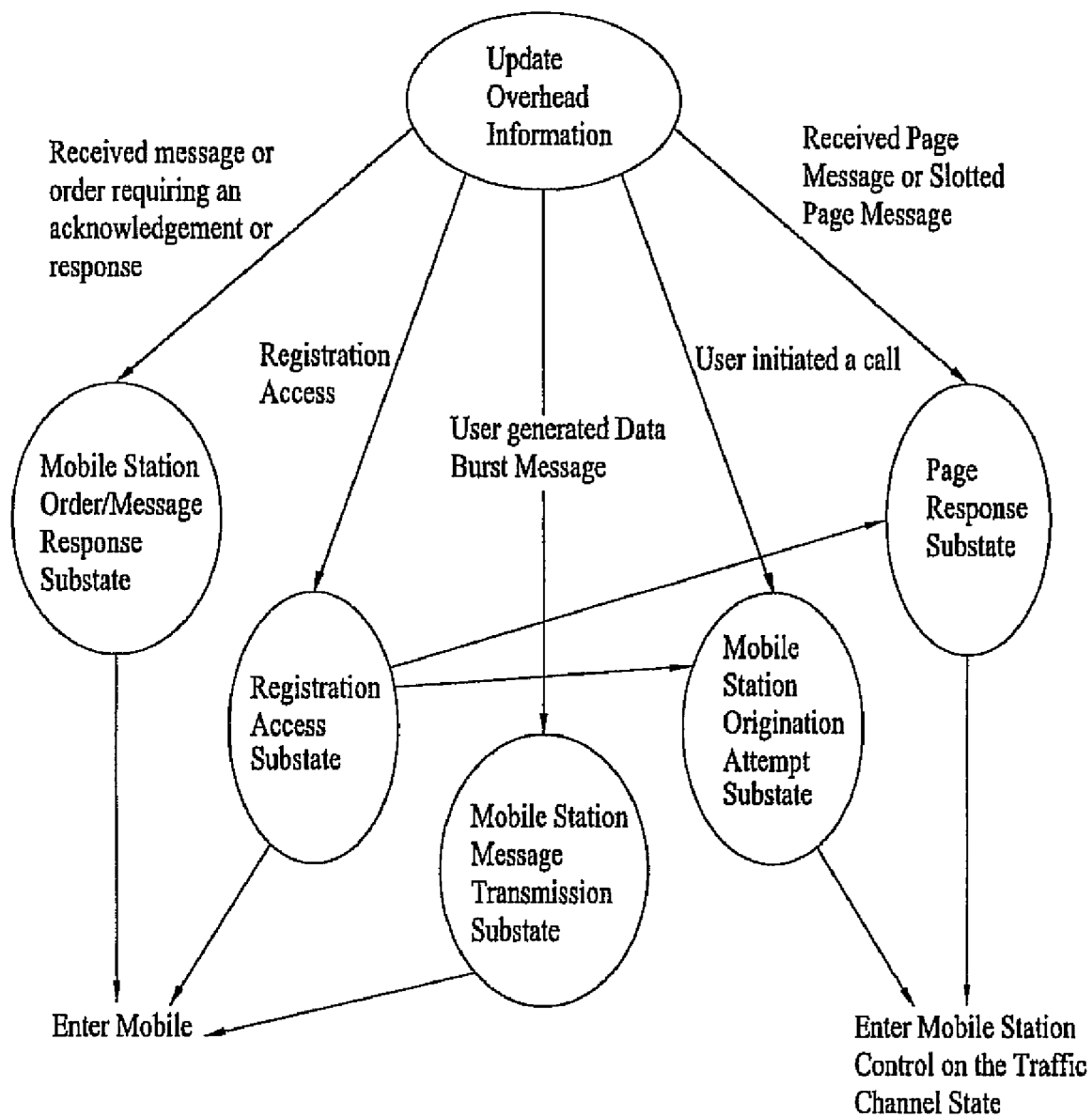
FIG. 6 illustrates the cdma2000 system access state.
Figure 7:
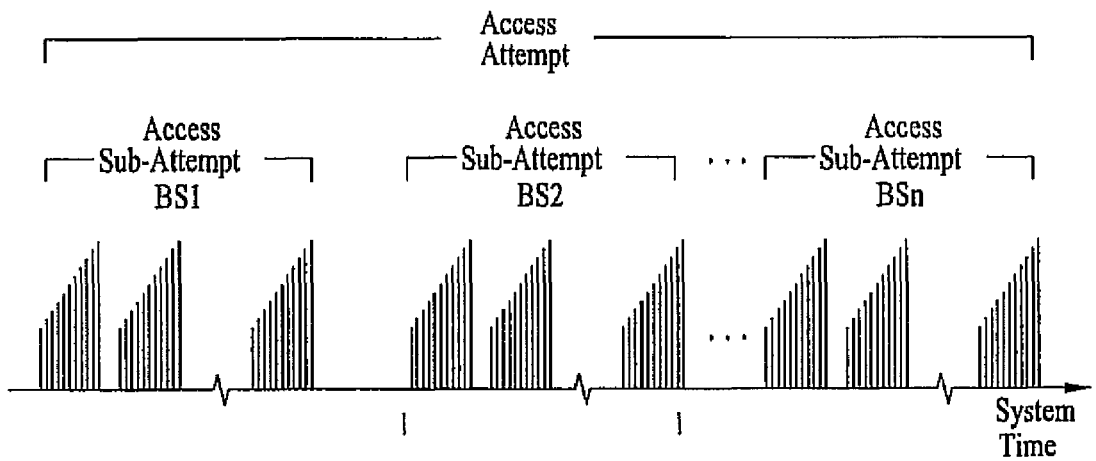
FIG. 7 illustrates a conventional cdma2000 access attempt.
Figure 8:
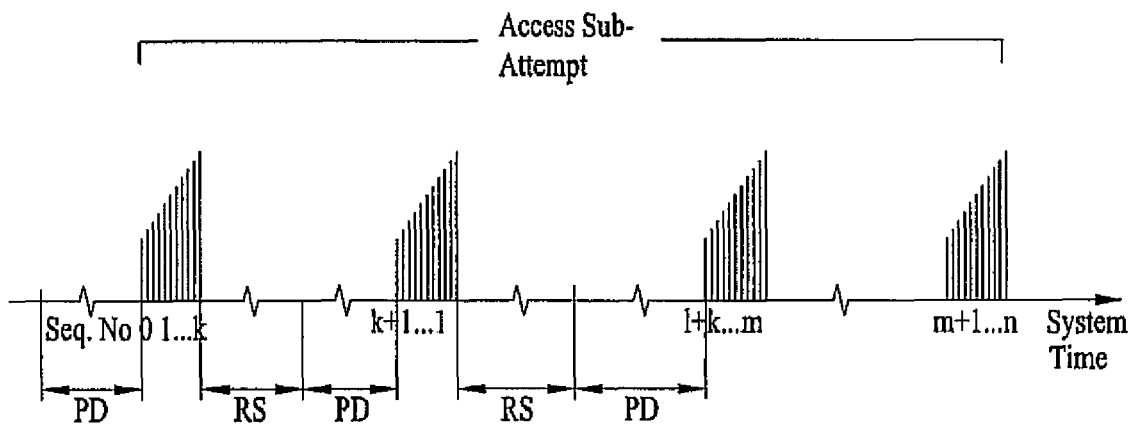
FIG. 8 illustrates a conventional cdma2000 access sub-attempt.
Figure 9:
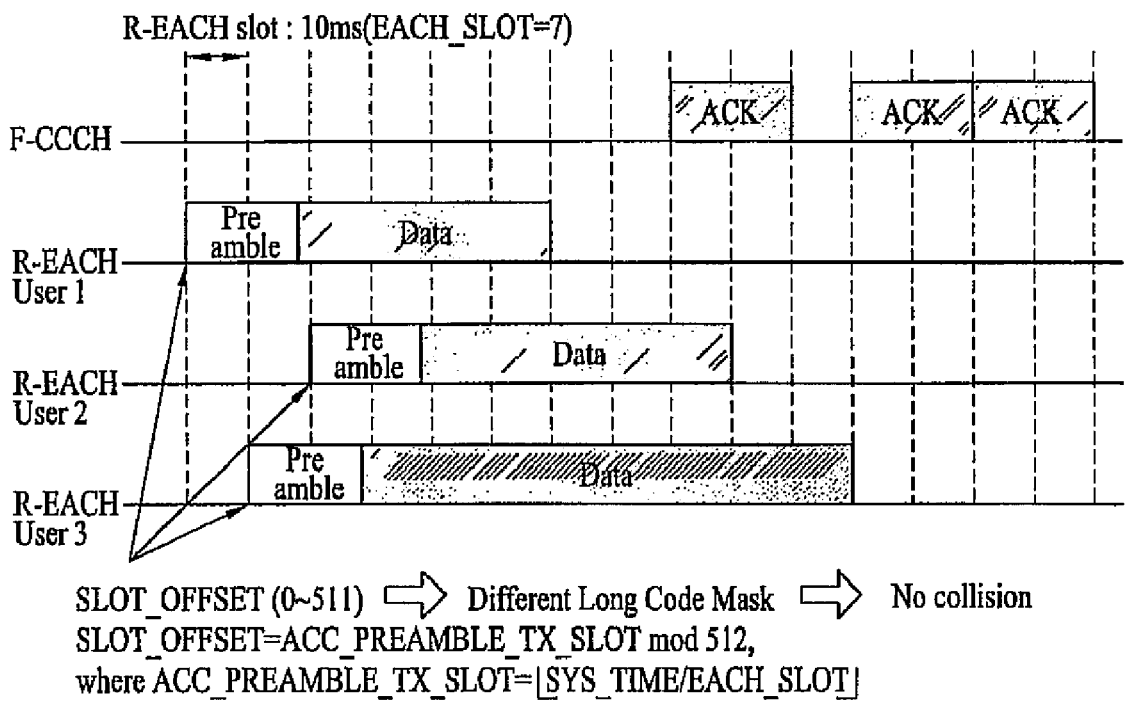
FIG. 9 illustrates the conventional cdma2000 system access state using slot offset.
Figure 10:
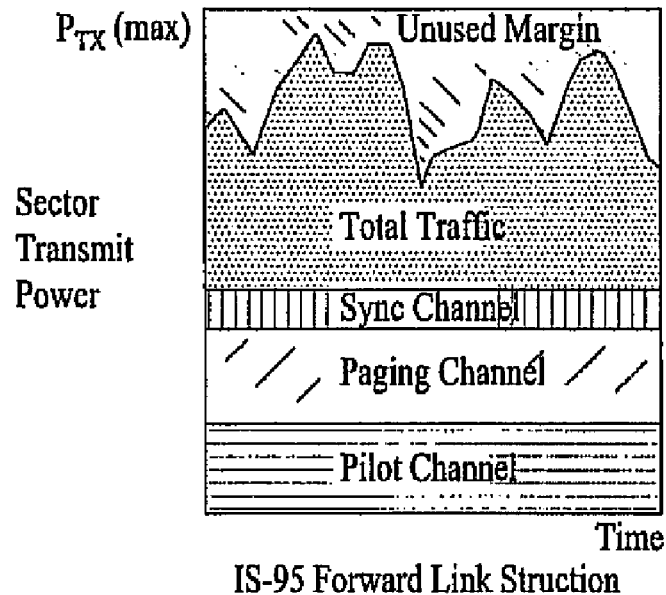
FIG. 10 illustrates a comparison of cdma2000 for 1x and 1xEV-DO.
Figure 10:
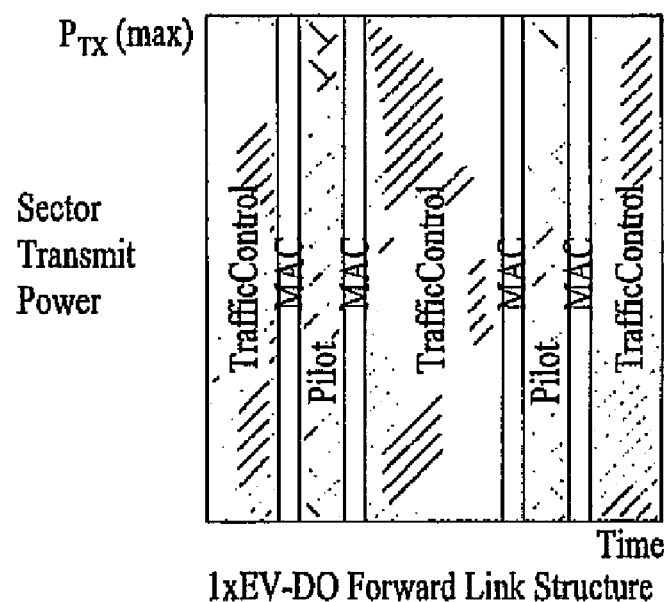
Figure 11:
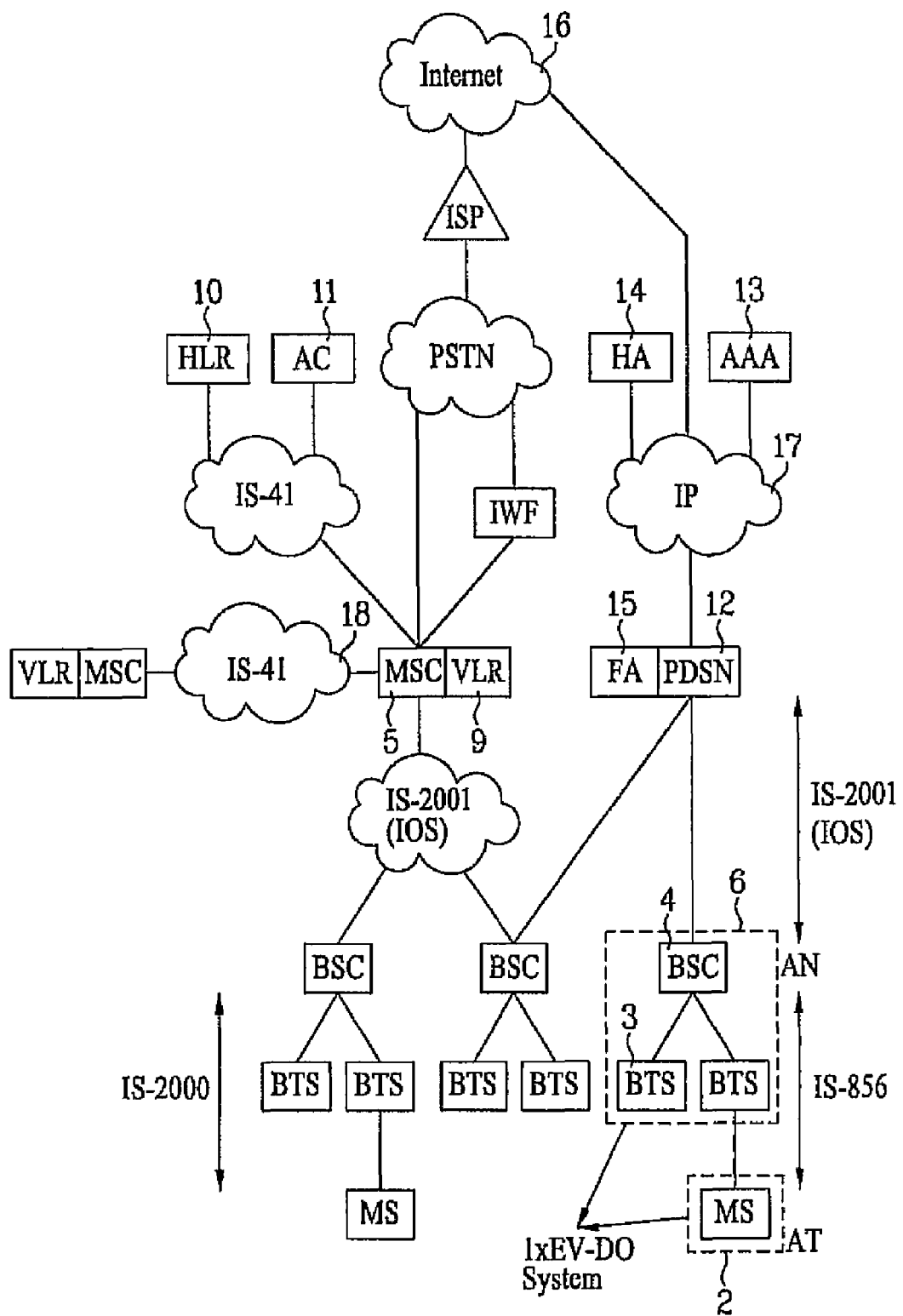
FIG. 11 illustrates a network architecture layer for a 1xEV-DO wireless network.
Figure 12:
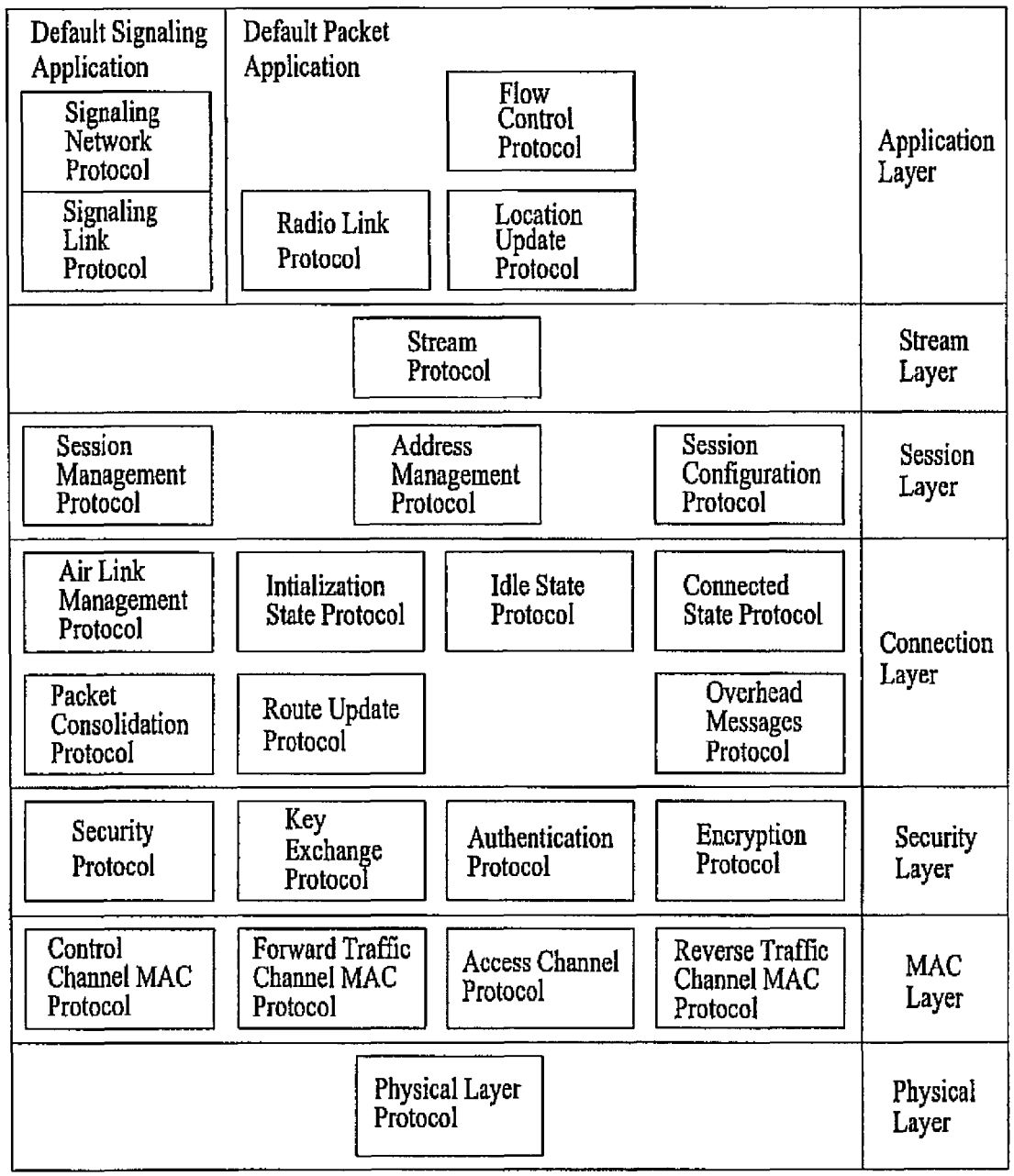
FIG. 12 illustrates 1xEV-DO default protocol architecture.
Figure 13:
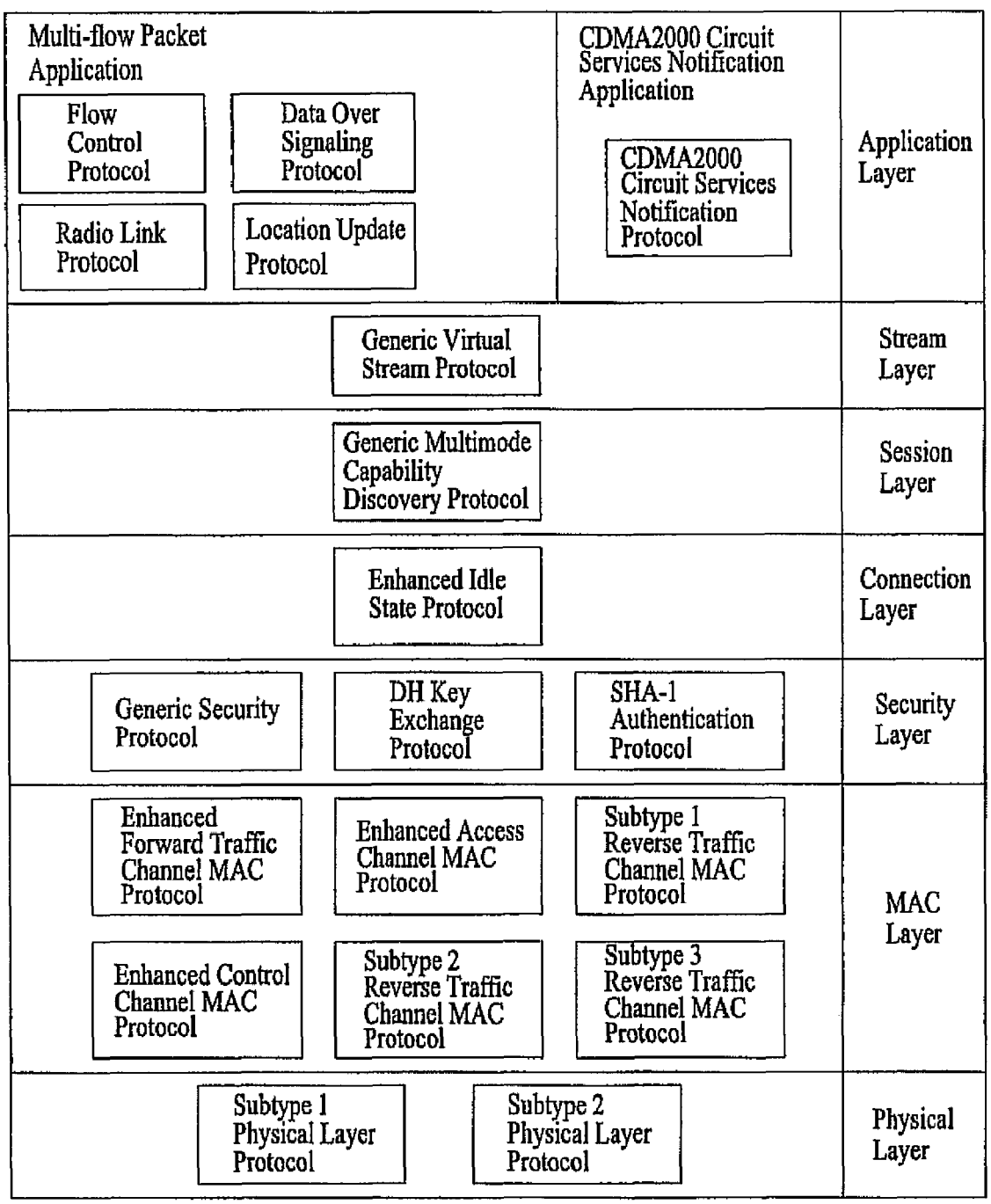
FIG. 13 illustrates 1xEV-DO non-default protocol architecture.
Figure 14:
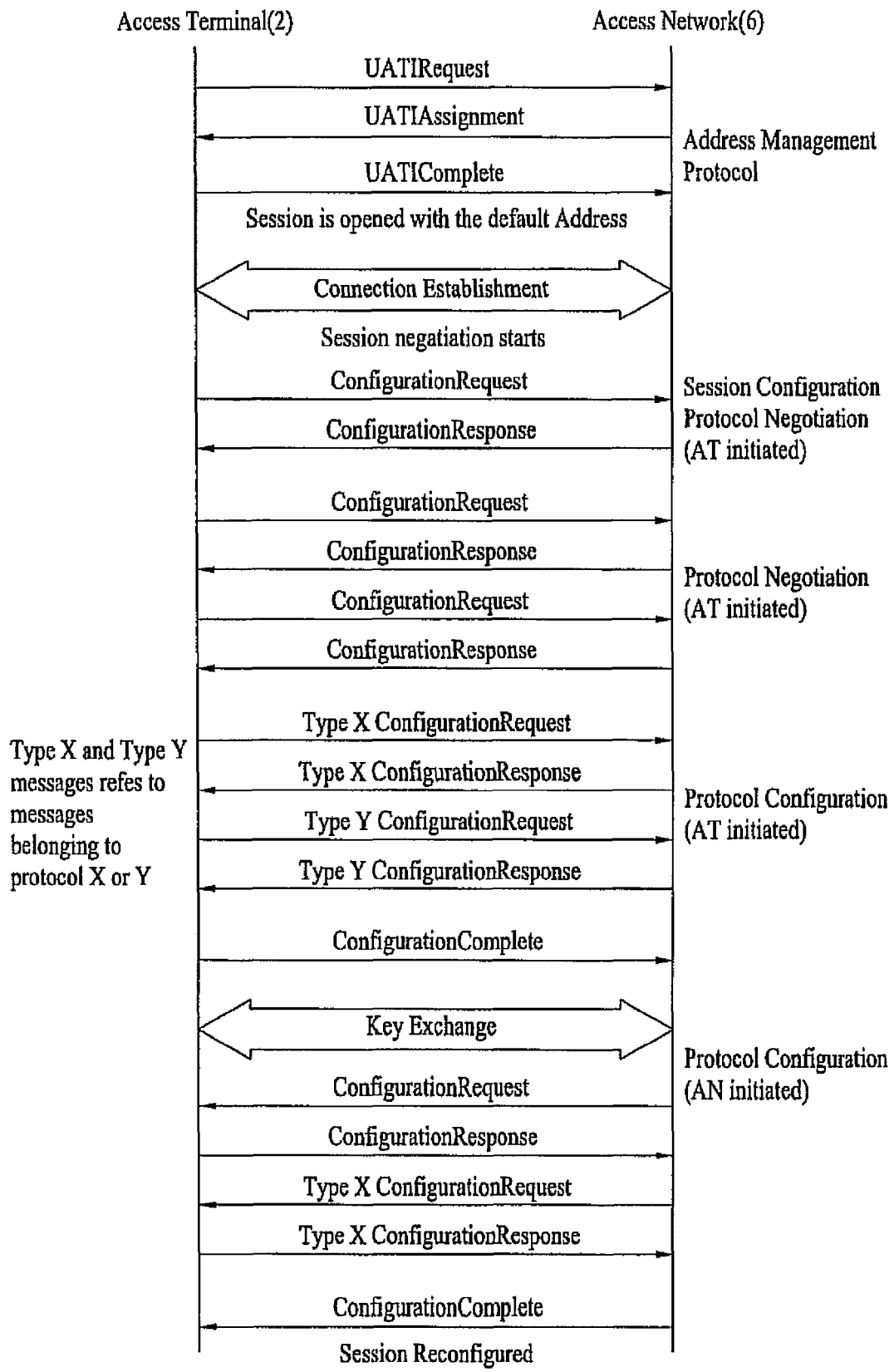
FIG. 14 illustrates 1xEV-DO session establishment.
Figure 15:
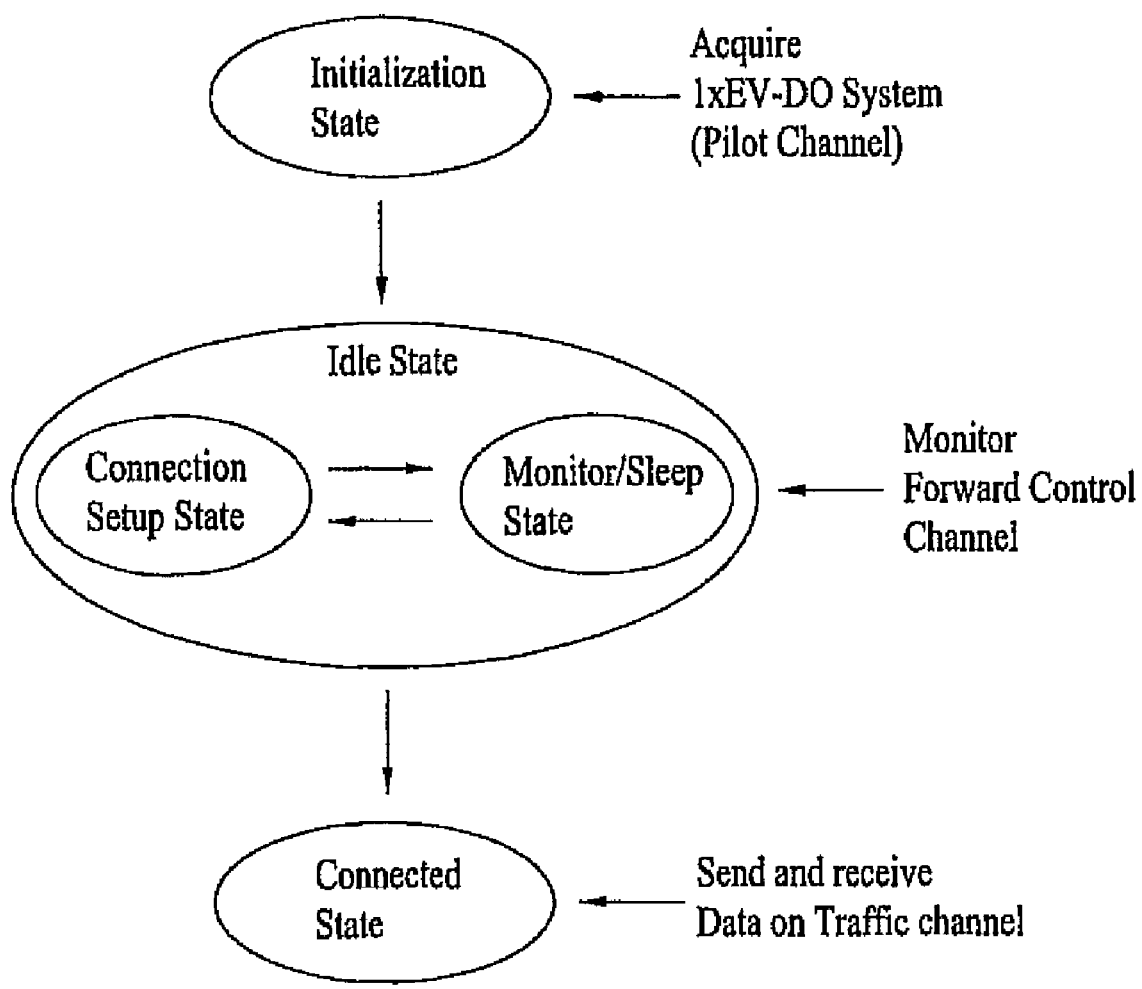
FIG. 15 illustrates 1xEV-DO connection layer protocols.

The present invention relates to an apparatus and method for reducing collisions of access probes from co-located mobile terminals by randomizing the time at which access probes are sent. Although the present invention is illustrated with respect to a mobile terminal, it is contemplated that the present invention may be utilized anytime it is desired to reduce collisions of signals transmitted from co-located communication devices.

The present invention is directed to random access, specifically random access performed according to a maximum delay parameter based on QoS or other factors, such as service class and mobile terminal position. When mobile terminals in a conventional system that receive a message through the same paging channel and are closely located to each other access a system, the terminals perform random access based on the same persistence value in order to reduce connection time. However, the persistence value approach results in access probe collisions.

Due to the fast connection requirement of a mobile terminal, a more efficient approach is necessary for access probe transmission. The present invention is directed not only to the reduction of access probe collision among mobile terminals in the same group but also other inter-group collisions.

In addition to a location-based approach to classify mobile terminals into different groups, QoS and GOS (Grade of Service) separations are provided. Accordingly, several approaches to reduce access probe collisions are presented. Access probes from co-located mobile terminals arriving at the network a few chips apart in time minimize access probe collisions allowing rapid connection setup without using access persistence.

According to the present invention a mobile terminal, designated as AT_k, computes a random delay, AccessDelay_k, in chips, between a minimum delay value, MinAccessDelay_k, and a maximum delay value, MaxAccessDelay_k. The random delay, AccessDelay_k, is then used to delay the starting time of the access probe from AT_k. The minimum delay value, MinAccessDelay_k, may be selected as "0" or another value less than that maximum delay value.

The determination of the maximum delay value, MaxAccessDelay_k, for each AT 2 may consider a mobile terminal's QoS requirement, location and relationship to other mobile terminals or service grade of the mobile terminal, such as Platinum, Gold, or Silver. Furthermore, mobile terminals that require the same QoS or are co-located, such as in a group call, may be assigned the same MaxAccessDelay_k, such that the index "k" denotes an index for a group of mobile terminals. Therefore, each mobile terminal or group may have its own random delay range, which is randomized between the minimum delay, MinAccessDelay_k, and the maximum delay, MaxAccessDelay_k.

The range of possible random delay values between the minimum delay, MinAccessDelay_k, and the maximum delay, MaxAccessDelay_k, for group "k" or for AT_k may be non-overlapped, with the range of possible delay values between the minimum delay, Min_AccessDelay_i, and the maximum delay, MaxAccessDelay_i, for group i or AT_i, where k≠i, ∀k, i.

The maximum delay, MaxAccessDelay_k, may be determined by the network and provided to a mobile terminal or may be negotiated between the network and mobile terminal. The maximum delay, MaxAccessDelay_k, may be adaptively updated by the network or mobile terminal with a change in the status or requirements of the network or mobile terminal.

Figure 16:
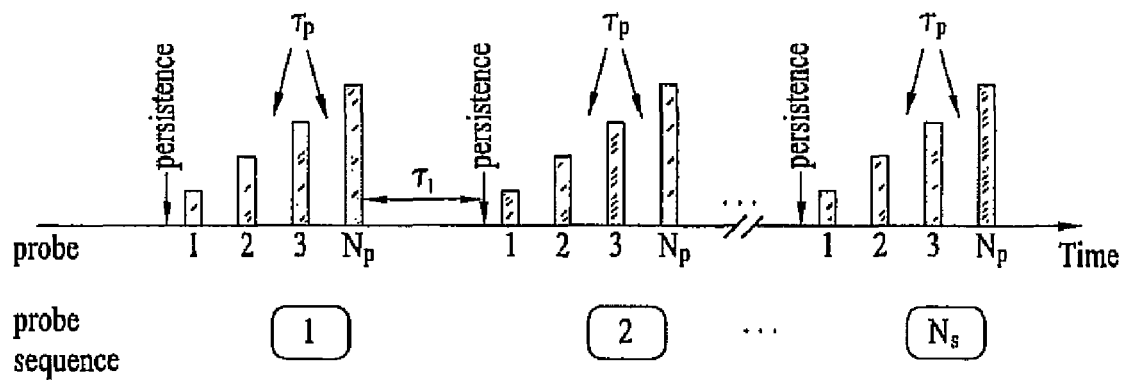
FIG. 16 illustrates an access probe sequence according to one embodiment of the present invention.
Figure 17:
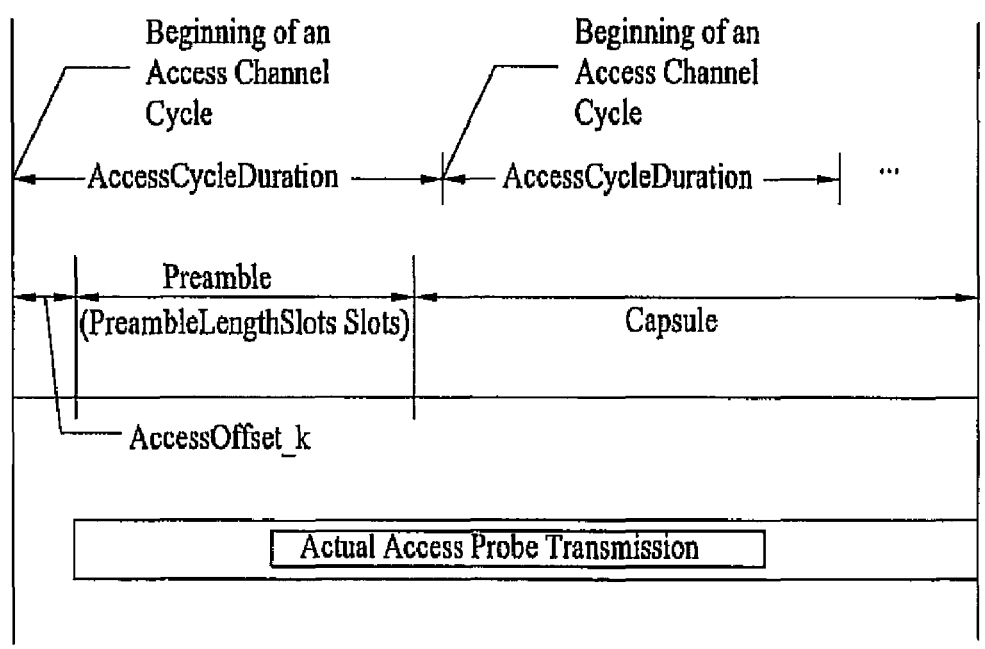
FIG. 17 illustrates an access probe structure according to one embodiment of the present invention.

FIG. 16 illustrates access probe sequences generated according to the present invention. FIG. 17 illustrates the access probe structure according to the present invention. Each mobile terminal may be assigned one or more AccessOffsets. When a mobile terminal decides to send an access probe, it can randomly choose one of the AccessOffsets.

The total access delay, TotalAccessDelay_K, of AT_K is the sum of AccessOffset_K shown in FIG. 17 and the random delay AccessDelay_k of each probe. The random delay, AccessDelay_k($\tau_p$), should be randomized for each access probe to minimize the probability of access collisions. Otherwise, the random delay, AccessDelay_k, may be fixed until probe sequence is complete or access succeeds.

Each group or mobile terminal may be assigned a deterministic randomization parameter with the randomization parameters assigned to each group or mobile terminal sufficiently separated that collisions may be avoided or minimized. The randomization parameter for each access probe of each mobile terminal may be the same or may be different and can be configured by the network or by negotiation between the mobile terminal and the network.

Before sending access probe, the mobile terminal can sense the access channels it is interested in. If there is an access probe existing, the mobile terminal will temporarily suspend its access probe and wait for another access time.

The random delay, AccessDelay_k, may be computed using a hash function based on a mobile terminal identifier and/or a probe number. Possible values of the hash function may be based on 8 chip increments in order to minimize access collisions and allow a wider search window.

For example, the maximum delay, MaxAccessDelay, may be 0, 8, 16, 24 or any other multiple of 8. Furthermore, a default value of 0 may be used. Mobile terminals switch back to a normal timeline for traffic channels.

The initial access attempt may not use the randomization process. The network may set the access search window according to either cell radius or the maximum delay, MaxAccessDelay_k. Furthermore, traffic search windows may be set according to the randomization used by a particular mobile terminal.

Figure 18:
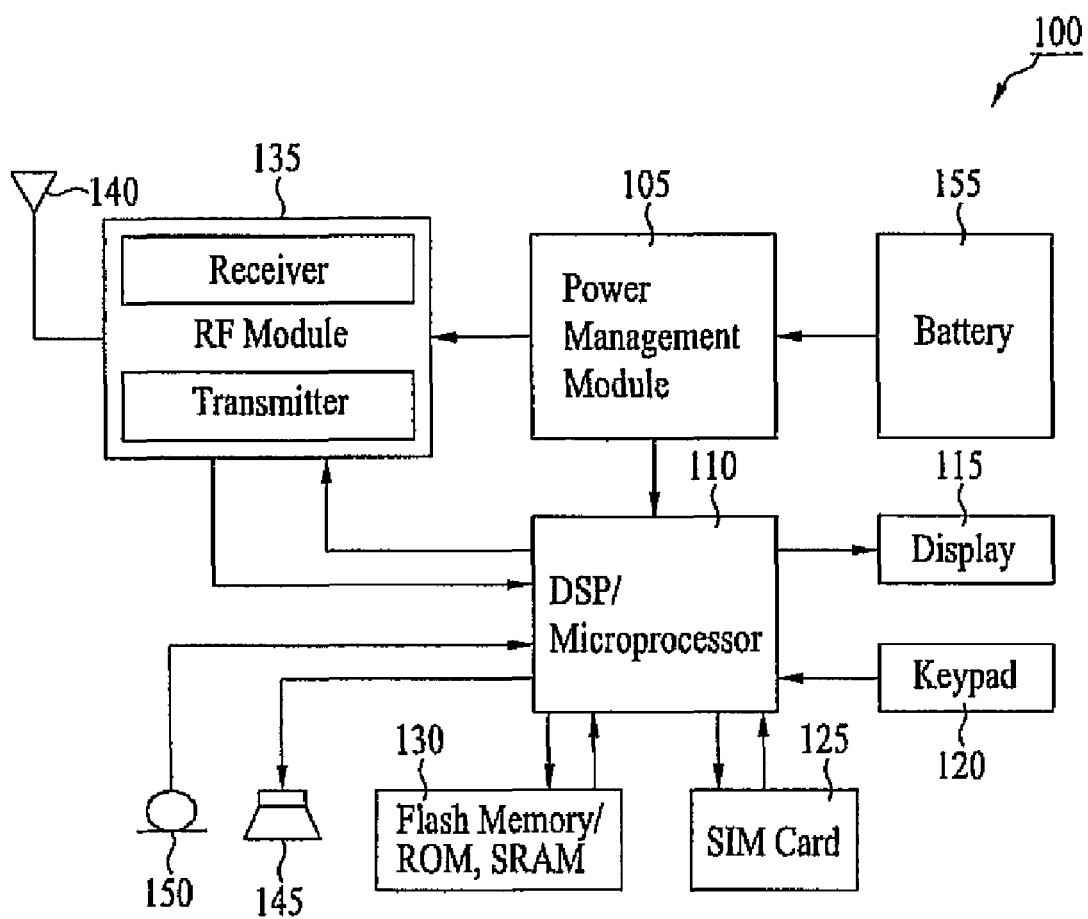
FIG. 18 illustrates a block diagram of a mobile station or access terminal according to one embodiment of the present invention.

FIG. 18 illustrates a block diagram of a mobile station (MS) or access terminal 100 according to one embodiment of the present invention. The AT 100 includes a processor (or digital signal processor) 110, RF module 135, power management module 105, antenna 140, battery 155, display 115, keypad 120, memory 130, SIM card 125 (which may be optional), speaker 145 and microphone 150.

A user enters instructional information, such as a telephone number, for example, by pushing the buttons of a keypad 120 or by voice activation using the microphone 150. The microprocessor 110 receives and processes the instructional information to perform the appropriate function, such as to dial the telephone number. Operational data may be retrieved from the Subscriber Identity Module (SIM) card 125 or the memory module 130 to perform the function. Furthermore, the processor 110 may display the instructional and operational information on the display 115 for the user's reference and convenience.

The processor 110 issues instructional information to the RF module 135, to initiate communication, for example, transmit radio signals comprising voice communication data. The RF module 135 includes a receiver and a transmitter to receive and transmit radio signals. An antenna 140 facilitates the transmission and reception of radio signals. Upon receiving radio signals, the RF module 135 may forward and convert the signals to baseband frequency for processing by the processor 110. The processed signals would be transformed into audible or readable information outputted via the speaker 145, for example. The processor 110 also includes the protocols and functions necessary to perform the various processes described herein with regard to cdma2000 or 1xEV-DO systems.

The processor 110 is adapted to perform the method disclosed herein for randomizing the time at which access probes are sent. The processor controls the RF module 135 to transmit access probes sequences as illustrated in FIG. 17 having the structure illustrated in FIG. 18.

Although the present invention is described with reference to cdma2000, 1xEV-DO and cdma2000 NxEV-DO, it may also be applied to other applicable communication systems.

There are two at least two typical application scenarios where the conventional persistence test may not work and the approaches of the present invention may work well. The first scenario is when multiple terminals are paged using the same control channel packet and require short connection setup time such that they transmit access probes at the same time with the same persistence value, typically set to 0. The second scenario is when multiple terminals in group calls are co-located and want fast connection setup such that the propagation delays of the mobile terminals are the same. Mobile terminals should be separated into different groups based on QoS, GoS or other possible criteria in addition to their geographic locations so that different access delay limits may be set for different groups.

The access probe randomization methods for minimizing access probe collision according the present invention are further enhanced by considering a mobile terminal's QoS or/and GoS (Grade of Service) requirement. Using the present invention, access probe randomization may be achieved for individual mobile terminals and mobile terminal groups in addition to a sector-based approach, whereby all the mobile terminals in a sector share the same value of maximum delay, MaxAccessDelay. Therefore, more flexible operation is achievable.

The present invention facilitates improved connection setup time for co-located mobile terminals in a group call that are paged at the same time. Without the randomization method of the present invention, all co-located mobile terminals in a group call would access the network within a few chips, thereby resulting in access probe collisions and longer connection setup times. Furthermore, even when only a portion of co-located mobile terminals support the methods of the present invention, a reduction in access probe collisions may be achieved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of providing a connection to a mobile terminal in a mobile communication system, the method comprising:
  receiving in the mobile terminal a predetermined maximum delay value from a network;
  transmitting a plurality of probe sequences, wherein each of the plurality of probe sequences comprises a plurality of access probes that individually request a connection to the network, and wherein each of the plurality of access probes is assigned an access probe number, and
  computing, for each of the probe sequences, a random delay between temporally adjacent access probes of the plurality of access probes, wherein each of the computed random delays causes a delay in the transmitting of an associated access probe of the plurality of access probes,
  wherein the computing of each of the random delays uses a hash function that is based upon the predetermined maximum delay value received from the network, a user ID of the mobile terminal, and the access probe number, and wherein the random delay of each respective access probe is calculated prior to the transmission of each access probe.

2. The method of claim 1, further comprising transmitting each of the plurality of access probes according to the random delay and an access offset.

3. The method of claim 2, further comprising randomly selecting one of a plurality of access offsets assigned to the mobile terminal.

4. The method of claim 2, wherein the access offset is equivalent to a time duration from a start of an access channel to a transmission of a first access probe of a first access probe sequence.

5. The method of claim 1, wherein the predetermined maximum delay value is set according to at least one of a quality of service (QoS) requirement of the mobile terminal, a location of the mobile terminal, a relationship between the mobile terminal and other mobile terminals and a service grade of the mobile terminal.

6. The method of claim 5, wherein the random delay comprises a number of chips.

7. The method of claim 1, further comprising receiving a paging message from a network.

8. The method of claim 1, wherein the random delay is less than or equal to the predetermined maximum delay value received from the network.

9. The method of claim 1, wherein the access probes are transmitted until either a network connection is acknowledged or all of a predetermined number of access probes of a first access probe sequence have been transmitted.

10. The method of claim 1, wherein the predetermined maximum value is different for each mobile terminal.

11. A method of providing a connection to a mobile terminal in a mobile communication system, the method comprising:
   receiving in the mobile terminal a predetermined maximum delay value from a network;
   transmitting a first probe sequence comprising a first plurality of access probes that individually request a connection to the network, and
   computing a random delay between temporally adjacent access probes of the first plurality of access probes, wherein each of the computed random delays associated with the first probe sequence causes a delay in the transmitting of an associated access probe of the first plurality of access probes, wherein the computing of each of the random delays associated with the first probe sequence uses a hash function that is based upon the predetermined maximum delay value received from the network, a user ID of the mobile terminal, and an access probe number assigned to each of the first plurality of the access probes, and wherein the random delay of each of the first plurality of access probes is calculated prior to the transmission of each of the first plurality of access probes;
   transmitting a second probe sequence comprising a second plurality of access probes that individually request a connection to the network, wherein the transmitting of the second probe sequence occurs if the network connection requested by the first plurality of access probes is not successful; and
   computing a random delay between temporally adjacent access probes of the second plurality of access probes, wherein each of the computed random delays associated with the second probe sequence causes a delay in the transmitting of an associated access probe of the second plurality of access probes, wherein the computing of each of the random delays associated with the second probe sequence uses a hash function that is based upon the predetermined maximum delay value received from the network, a user ID of the mobile terminal, and the access probe number assigned to each of the second plurality of access probes, and wherein the random delay of each of the second plurality of access probes is calculated prior to the transmission of each of the second plurality of access probes.

12. The method of claim 11, further comprising transmitting each of the second plurality of access probes of the second probe sequence according to the random delay associated with the second probe sequence.

13. The method of claim 11, wherein the first plurality of access probes are transmitted until either a network connection is acknowledged or all of the first plurality of access probes of the first probe sequence have been transmitted.

14. The method of claim 11, wherein the random delay is less than or equal to the predetermined maximum delay value received from the network.

15. The method of claim 11, wherein the predetermined maximum value is different for each mobile terminal.

16. A mobile terminal, comprising:
   a transmitting/receiving unit adapted to transmit one or more access probes to the network and receive a predetermined maximum delay value from a network;
   a display unit adapted to display user interface information;
   an input unit adapted to input user data; and
   a processing unit configured to:
      cause the transmitting/receiving unit to transmit a probe sequence comprising a plurality of access probes that individually request a connection to the network, wherein each of the plurality of access probes is assigned an access probe number, and
      compute a random delay between temporally adjacent access probes of the plurality of access probes, wherein each of the computed random delays associated with the probe sequence causes a delay in the transmitting of an associated access probe of the plurality of access probes, wherein the computing of each of the random delays uses a hash function that is based upon the predetermined maximum delay value received from the network, a user ID of the mobile terminial, and the access probe number, and
   wherein the random delay of each respective access probe is calculated prior to the transmission of each access probe.

17. The terminal of claim 16, wherein the processing unit is further adapted to transmit each of the plurality of access probes according to the random delay and an access offset.

18. The terminal of claim 17, wherein the access offset is equivalent to a time duration from a start of an access channel to a transmission of a first access probe of the plurality of access probes.

19. The terminal of claim 16, wherein the predetermined maximum delay value is set according to at least one of a quality of service (QoS) requirement of the mobile terminal, a location of the mobile terminal, a relationship between the mobile terminal and other mobile terminals and a service grade of the mobile terminal.

20. The terminal of claim 19, wherein the random delay comprises a number of chips.

21. The terminal of claim 16, wherein the processing unit is further adapted to randomly select one of a plurality of access offsets assigned to the mobile terminal.

22. The terminal of claim 16, wherein the random delay is less than or equal to the predetermined maximum delay received from the network.

23. The terminal of claim 16, wherein the access probes are transmitted until either a network connection is acknowledged or all of a predetermined number of the access probes of a first access probe sequence have been transmitted.

24. The method of claim 16, wherein the predetermined maximum value is different for each mobile terminal.

25. A mobile terminal, comprising:
   a transmitting/receiving unit adapted to transmit one or more access probes to the network and receive a predetermined maximum delay value from a network;
   a display unit adapted to display user interface information;
   an input unit adapted to input user data; and
   a processing unit configured to:
      cause the transmitting/receiving unit to transmit a first probe sequence comprising a first plurality of access probes that individually request a connection to the network, and
      compute a random delay between temporally adjacent access probes of the first plurality of access probes, wherein each of the computed random delays associated with the first probe sequence causes a delay in the transmitting of an associated access probe of the first plurality of access probes, wherein the computing of each of the random delays associated with the first probe sequence uses hash function that is based upon the predetermined maximum delay value received from the network, a user ID of the mobile terminal, and an access probe number assigned to each of the first plurality of access probes, and wherein the random delay of each of the first plurality of access probes is calculated prior to the transmission of each of the first plurality of access probes;

cause the transmitting/receiving unit to transmit a second probe sequence comprising a second plurality of access probes that individually request a connection to the network, wherein the transmitting of the second probe sequence occurs if the network connection requested by the first plurality of access probes is not successful; and computing a random delay between temporally adjacent access probes of the second plurality of access probes, wherein each of the computed random delays associated with the second probe sequence causes a delay in the transmitting of an associated access probe of the second plurality of access probes, wherein the computing of each of the random delays associated with the second probe sequence uses a hash function that is based upon the predetermined maximum delay value received from the network, a user ID of the mobile terminal, and the access probe number assigned to each of the second plurality of access probes, and wherein the random delay of each of the second plurality of access probes is calculated prior to the transmission of each of the second plurality of access probes.

26. The terminal of claim 25, wherein the processing unit is further adapted to transmit the second plurality of access probes according to the random delay associated with the second probe sequence.

27. The terminal of claim 25, wherein the first plurality of access probes are transmitted until either a network connection is acknowledged or all of the first plurality of access probes have been transmitted.

28. The terminal of claim 25, wherein the random delay is less than or equal to the predetermined maximum delay value received from the network.

* * * * *